US012598253B2

(12) United States Patent
Pribić et al.

(10) Patent No.: US 12,598,253 B2
(45) Date of Patent: Apr. 7, 2026

(54) SYSTEMS AND METHODS FOR MEDIA ANALYSIS FOR CALL STATE DETECTION

(71) Applicant: Infobip Ltd., London (GB)

(72) Inventors: Kosta Pribić, Zagreb (HR); Sead Delalić, Sarajevo (BA); Hadžem Hadžić, Sarajevo (BA); Kemal Altwlkany, Sarajevo (BA); Amar Kurić, Sarajevo (BA); Luka Čižmek, Zagreb (HR); Ivan Đumlija, Velika Gorica (HR)

(73) Assignee: Infobip Ltd., London (GB)

( * ) Notice: Subject to any disclaimer, the term of this patent is extended or adjusted under 35 U.S.C. 154(b) by 67 days.

(21) Appl. No.: 18/501,134

(22) Filed: Nov. 3, 2023

(65) Prior Publication Data

US 2025/0150530 A1    May 8, 2025

(51) Int. Cl.
*H04M 3/436*      (2006.01)
*H04M 3/493*      (2006.01)

(52) U.S. Cl.
CPC ....... *H04M 3/4365* (2013.01); *H04M 3/4936* (2013.01)

(58) Field of Classification Search
CPC ............. H04M 3/4365; H04M 3/4936; H04M 2201/41; H04M 3/2281; H04M 2203/6054; H04M 3/436; H04M 2201/40; H04M 2203/558; H04M 3/42059; H04M 3/385; H04M 2203/2027; H04M 3/382; H04M 2201/18; H04M 2203/6027; H04M 2203/6045; H04M 3/42068; H04M 1/663; H04M 2250/74; H04M 2203/556; H04M 3/42093; G10L 17/00; G10L 25/51; G10L 17/04; G10L 15/08
See application file for complete search history.

(56) References Cited

U.S. PATENT DOCUMENTS

| | | | | |
|---|---|---|---|---|
| 8,065,146 B2 * | 11/2011 | Acero | ..................... | G10L 15/26 704/235 |
| 9,100,479 B2 * | 8/2015 | Bouzid | ............... | H04M 3/5158 |
| 9,571,994 B2 * | 2/2017 | Yagey | ................... | H04M 3/533 |
| 9,596,578 B1 * | 3/2017 | Clark | ........................ | G10L 17/26 |
| 10,757,252 B1 * | 8/2020 | Quilici | ............. | H04M 3/42059 |
| 10,848,618 B1 * | 11/2020 | Quilici | ................. | H04M 3/436 |
| 11,050,876 B2 * | 6/2021 | Balasubramaniyan | ...................... H04M 3/2281 |
| 11,558,506 B1 * | 1/2023 | Cardillo | .................. | G10L 17/26 |

(Continued)

OTHER PUBLICATIONS

PCT International Application No. PCT/EP2024/079168, Partial International Search Report and Provisional Opinion of the International Searching Authority, dated Jan. 7, 2025, 13 pages.

*Primary Examiner* — Akelaw Teshale
(74) *Attorney, Agent, or Firm* — Bookoff McAndrews, PLLC

(57) ABSTRACT

A method includes: initiating a call to a telephone number based on a request from a call originator; generating a fingerprint of an audio sample of the call; matching the fingerprint to a record in a fingerprint database; determining, based on the matched record, whether the recorded call is an actionable machine response, a non-actionable machine response, or a human response, as a detected response; providing the detected response to the call originator; receiving, based on the providing the detected response, an action from the call originator; and performing the action associated with the call.

20 Claims, 7 Drawing Sheets

100

(56)          References Cited

U.S. PATENT DOCUMENTS

| | | | |
|---|---|---|---|
| 12,244,762 B2 * | 3/2025 | Horton | H04M 3/42068 |
| 2013/0259211 A1 * | 10/2013 | Vlack | G06F 16/284 |
| | | | 379/88.01 |
| 2014/0369479 A1 * | 12/2014 | Siminoff | H04M 3/5158 |
| | | | 379/88.01 |
| 2017/0229133 A1 * | 8/2017 | Bilobrov | G10L 25/18 |
| 2018/0007199 A1 * | 1/2018 | Quilici | H04M 3/42153 |
| 2019/0391788 A1 * | 12/2019 | Blake | G10L 25/54 |
| 2021/0136200 A1 * | 5/2021 | Li | G10L 17/26 |
| 2021/0141879 A1 * | 5/2021 | Calahan | G10L 17/00 |
| 2023/0041266 A1 * | 2/2023 | Earman | G06N 3/084 |
| 2023/0082094 A1 * | 3/2023 | Keret | G06F 21/32 |
| | | | 726/2 |
| 2023/0085012 A1 * | 3/2023 | Baughman | G10L 25/24 |
| | | | 704/235 |
| 2023/0386484 A1 * | 11/2023 | Jangi | G10L 25/18 |
| 2023/0388414 A1 * | 11/2023 | Bharrat | G06N 20/00 |
| 2024/0161753 A1 * | 5/2024 | Dentel | G10L 17/04 |
| 2024/0363125 A1 * | 10/2024 | Khoury | G10L 17/08 |

* cited by examiner

200

205 RECORD LIVE CALL

210 SPECTRAL FINGERPRINT GENERATION IN 1 SEC BLOCKS

215 MATCH FINGERPRINT IN DATABASE

220 STOP CALL IF VOICEMAIL DETECTED

| GROUPED TRANSCRIPTION | COUNT | AUTOMATICALLY ASSIGNED CATEGORY | HUMAN CORRECTION |
|---|---|---|---|
| PLEASE LEAVE YOUR MESSAGE FOR... | 1815 | VOICEMAIL | |
| YOUR CALL HAS BEEN FORWARDED | 894 | VOICEMAIL | |
| PLEASE HOLD WHILE I TRY CO | 275 | PBX ANNOUNCEMENT | |
| THANK YOU FOR CALLING ACME | 137 | VOICEMAIL | PBX ANNOUNCEMENT |
| PLEASE ENTER X-DIGIT MEET | 115 | <UNKNOWN> | VOICEMAIL |
| <SILENCE> | 102 | <SILENCE> | |
| YOU HAVE REACHED ZZZ | 100 | VOICEMAIL | |
| XXXXXXXXX | 5 | <COUNT THRESHOLD TOO LOW, REMOVED TRANSCRIPTION> | |
| XXXXXXXXX | 2 | <COUNT THRESHOLD TOO LOW, REMOVED TRANSCRIPTION> | |
| XXXXXXXXX | 1 | <COUNT THRESHOLD TOO LOW, REMOVED TRANSCRIPTION> | |

FIG. 4

SYSTEMS AND METHODS FOR MEDIA ANALYSIS FOR CALL STATE DETECTION

TECHNICAL FIELD

Various embodiments of the present disclosure relate generally to media analysis for call state detection, and, more particularly, to determining whether a call has connected and whether a response from the given telephone number is an actionable machine response, a non-actionable machine response, or a human response.

BACKGROUND

A customer may request that a telecommunication service provider deliver a connection between the customer and a given telephone number. The service provider may initiate the call to the given telephone number and may determine whether the call connected to the given telephone number. This determination may provide the customer with information to decide whether to take one or more given next steps based on determining whether the call connected to the given telephone number. However, determining whether the call connected to the given telephone number may not provide sufficient information for determining potential next steps, and determining such sufficient information may be time-consuming, processing-intensive, and/or inaccurate. Further, it may be difficult to distinguish between audio generated by an intermediary (e.g., a telecommunication provider, an automated process, etc.) and audio generated by a target call recipient.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In some aspects, the techniques described herein relate to a method including: initiating a call to a telephone number based on a request from a call originator; generating a fingerprint of an audio sample of the call; matching the fingerprint to a record in a fingerprint database; determining, based on the matched record, whether the recorded call is an actionable machine response, a non-actionable machine response, or a human response, as a detected response; providing the detected response to the call originator; receiving, based on the providing the detected response, an action from the call originator; and performing the action associated with the call.

In some aspects, the techniques described herein relate to a method, wherein the generating the fingerprint of the audio sample of the call includes: generating a first fingerprint of a first audio sample of the call, and generating a second fingerprint of a second audio sample of the call.

In some aspects, the techniques described herein relate to a method, wherein the second audio sample of the call includes the first audio sample of the call, such that the second audio sample is a longer duration sample than the first audio sample.

In some aspects, the techniques described herein relate to a method, wherein the generating the fingerprint of the audio sample of the call includes: detecting silence in the audio sample of the call; determining that the detected silence in the audio sample of the call exceeds a threshold; retrieving a different audio sample of the call; and generating the fingerprint of the different audio sample of the call.

In some aspects, the techniques described herein relate to a method, wherein the generating the fingerprint of the audio sample of the call includes: classifying the audio sample of the call into an announcement, among classifications including music, ringing, and announcement; and generating the fingerprint of the audio sample of the call based on classifying the audio sample.

In some aspects, the techniques described herein relate to a method, wherein the classifying the audio sample includes using one or more machine learning models.

In some aspects, the techniques described herein relate to a method, wherein the matching the fingerprint to the record in the fingerprint database includes: determining that a similarity of the fingerprint to the record exceeds a threshold.

In some aspects, the techniques described herein relate to a method, wherein the matching the fingerprint to the record in the fingerprint database includes: determining that a similarity of the fingerprint, as a first fingerprint, to the record is below a threshold; generating a second fingerprint of an extended audio sample of the call, wherein the extended audio sample includes the audio sample, as a first audio sample, used for the first fingerprint merged with a second audio sample of the call subsequent to the first audio sample; and determining that a similarity of the second fingerprint to the record is above the threshold.

In some aspects, the techniques described herein relate to a method, wherein the providing the detected response to the call originator includes: providing the detected response to the call originator as a status code.

In some aspects, the techniques described herein relate to a method, wherein the performing the action associated with the call includes: disconnecting the call, retrying the call on one of a same channel, route, or gateway, or retrying the call on a different channel, route, or gateway.

In some aspects, the techniques described herein relate to a method including: recording audio samples of calls to telephone numbers as a dataset; generating corresponding text transcriptions of the recorded audio samples; generating corresponding fingerprints of the recorded audio samples; clustering the recorded audio samples based on the fingerprints and text transcriptions, as groups; assigning a category to each group; and generating a fingerprint database with the groups and the assigned categories.

In some aspects, the techniques described herein relate to a method, further including: classifying the audio sample of the call as music, ringing, or announcement; and removing recorded audio samples from the dataset with a classification of music or ringing.

In some aspects, the techniques described herein relate to a method, wherein the clustering the recorded audio samples based on the fingerprints and text transcriptions includes: grouping recorded audio samples with similar text transcriptions into a single group.

In some aspects, the techniques described herein relate to a method, further including: comparing the text transcriptions of the recorded audio samples; and removing redundant recorded audio samples from the dataset where the comparing text transcriptions indicates that a first recorded audio sample is included in a second recorded audio sample, by removing the first recorded audio sample and associated text transcription from the dataset.

In some aspects, the techniques described herein relate to a method, further including: comparing the fingerprints of the recorded audio samples; and removing redundant recorded audio samples from the dataset where the comparing fingerprints indicates that a first recorded audio sample is similar to a second recorded audio sample having a longer duration than the first recorded audio sample, by removing the first recorded audio sample and associated fingerprint from the dataset.

In some aspects, the techniques described herein relate to a method, further including: incorporating fingerprints of new audio samples of calls to telephone numbers into the generated fingerprint database.

In some aspects, the techniques described herein relate to a method, wherein: the categories include an actionable machine response, a non-actionable machine response, or a human response, and the actionable machine response includes a Private Branch eXchange announcement requesting extension input.

In some aspects, the techniques described herein relate to a system including one or more processors configured to execute a method including: initiating a call to a telephone number based on a request from a call originator; generating a fingerprint of an audio sample of the call; matching the fingerprint to a record in a fingerprint database; determining, based on the matched record, whether the recorded call is an actionable machine response, a non-actionable machine response, or a human response, as a detected response; providing the detected response to the call originator; receiving, based on the providing the detected response, an action from the call originator; and performing the action associated with the call.

In some aspects, the techniques described herein relate to a system, wherein the generating the fingerprint of the audio sample of the call includes: classifying the audio sample of the call into an announcement, among classifications including music, ringing, and announcement; and generating the fingerprint of the audio sample of the call based on classifying the audio sample.

In some aspects, the techniques described herein relate to a system, wherein the performing the action associated with the call includes: disconnecting the call, retrying the call on one of a same channel, route, or gateway, or retrying the call on a different channel, route, or gateway.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts exemplary timelines for detecting a call state, according to one or more embodiments.

FIG. 4 depicts exemplary categories for a fingerprint database, according to one or more embodiments.

DETAILED DESCRIPTION OF EMBODIMENTS

Figure 1:
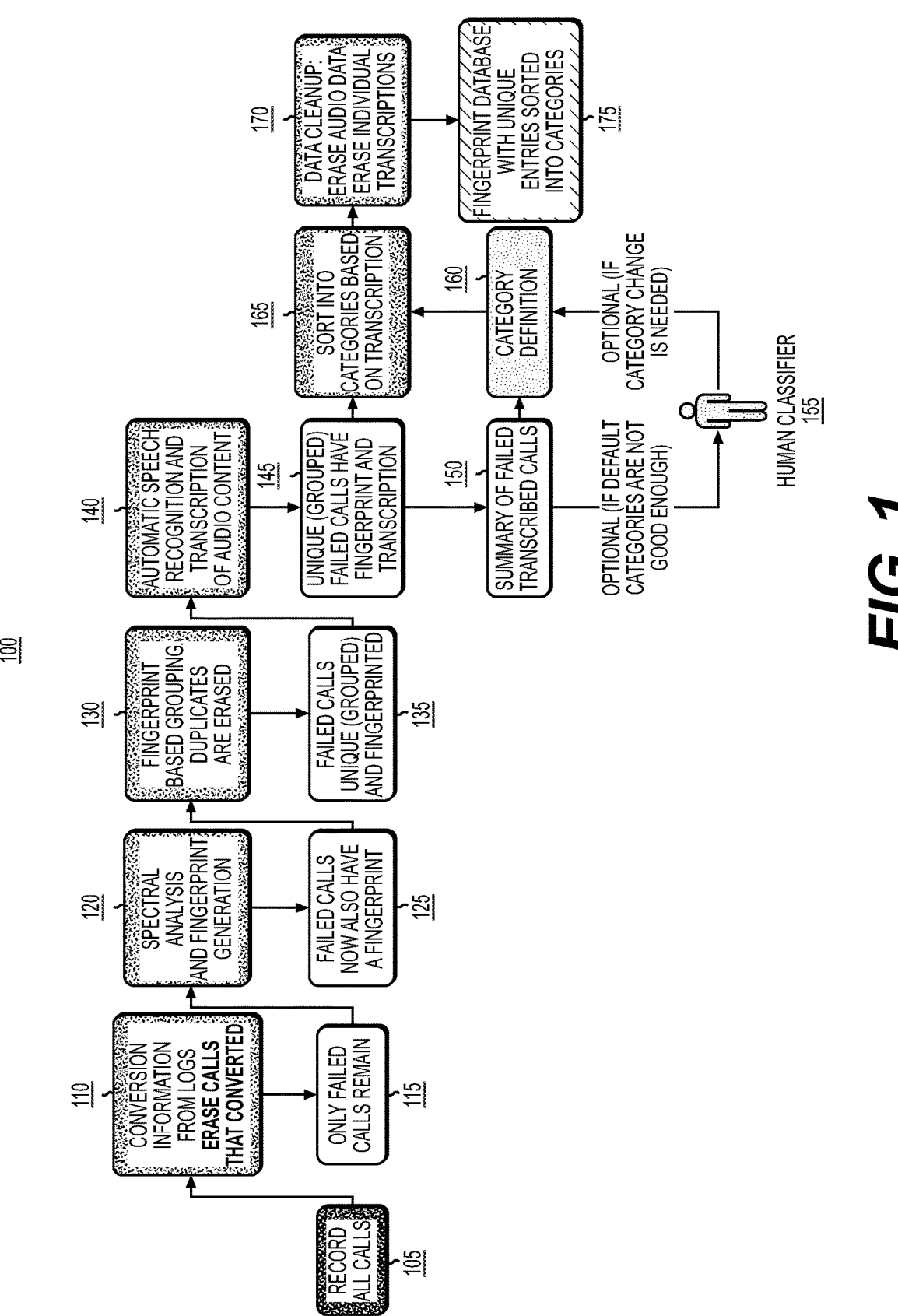
FIG. 1 depicts a flowchart of a method of creating a fingerprint database, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Various embodiments of the present disclosure relate generally to media analysis for call state detection, and, more particularly, to determining whether a call has connected and whether a response from the given telephone number is an actionable machine response, a non-actionable machine response, or a human response.

According to one or more embodiments a customer may request that a telecommunication service provider deliver a connection between the customer and a given telephone number. The service provider may initiate the call to the given telephone number, determine whether the call connected to the given telephone number, and determine whether a response from the given telephone number is (i) an actionable machine response, such as a directory with an extension, (ii) a non-actionable machine response, such as a voicemail announcement, for example, or (iii) a human response. This determination may provide the customer with information to decide whether to proceed with a scenario for the machine or human at the given telephone number, such as providing the person with a message to respond to a multi-factor authentication request, for example. As further discussed herein, determining the type of response from the given telephone number may be implemented in a time-efficient, processing-efficient, and/or accurate manner (e.g., above a minimum accuracy threshold).

One or more embodiments may perform automated media analysis of a call, in a ringing phase or after the call connects, to quickly detect a state of the call with relatively low resource consumption. For time sensitive connection cases where either the originator or the intermediary of the call is a machine, providing a correct and well-timed status code may be crucial. One or more embodiments may provide rapid detection of network/user state audio announcements (e.g., busy, congestion, etc.) in a connecting, or early, phase and provide rapid detection of voicemail announcements when the call connects. Based on this machine-interpretable information, a call originator may choose to disconnect and retry or fall back to another channel quickly enough to prevent the time sensitive connection case from expiring.

One or more embodiments may detect voicemail, where a call originator may not desire to interact with a voicemail response. Some voicemail detection technology may be based on detecting automated (e.g., "beep") sounds. Some voicemail detection technology may be based on converting audio to a spectrogram and analyzing the spectrogram using Machine Learning algorithms to detect a voicemail response, such as from an answering machine, for example. However, voicemail detection technology may face several limitations, including accuracy and speed, for example.

Accuracy (positive and false positive) may not be a critical factor in cases with systems for voicemail detection that involve unsolicited traffic that has low ASR (Answer-Seizure Ratio), such as less than 50%, for example. However, if the traffic profile is solicited, has a high ASR (e.g., above a given ASR threshold) and relatively little voicemail, then false positives may be a problem because all traffic should be analyzed. For example, to improve a business case conversion from approximately 90% to approximately 92% with expected approximately 4% voicemail, detection accuracy should be at least approximately 50% with a false positive ratio that is approximately 0%, because any false positive will reduce the conversion significantly. Some voicemail detection technology operates in a range of approximately 85%-95% accuracy, with false positives that vary significantly.

For speed of detection, some detections may require an audio sample with a duration of approximately four seconds. In the case of charging models that are based on detection per second, speed of detection may be a critical factor. In the case of exceptions, some machine-generated announcements, such as Private Branch eXchange (PBX) announcements requesting extension input, should not be detected as a voicemail response. One or more embodiments may detect early media announcements. In some countries, when a user is unreachable, some telecommunication providers may, instead of providing a given sound (e.g., a ringing sound), play an audio announcement that explains why the user is unreachable. The audio announcements may prevent accurate call records or retrying the call in a timely fashion or with any accuracy. Some early media detection technology may use approaches such as detecting silence, for example, which may not provide accurate mapping.

One or more embodiments may increase a speed of detection relative to some solutions. In a scenario with live callers with limited patience, quick detection of a failed call may be critical because retrying the call with a different route may save the call. One or more embodiments may increase a detection accuracy relative to some solutions. A busy signal that is misclassified as congestion and is retried may result in a bad user experience for the called party. Audio announcements of any kind have been a problem for automated call systems or routing applications, and deriving meaning from audio announcements has been hampered by resource cost per call. One or more embodiments may classify audio announcements in real time using media processing techniques.

Connectivity providers may cater to large companies that use multiple connectivity providers. Companies may change providers based on quality, which may be measured in a conversion rate, where out of all calls sent, how many resulted in a successful business case. An approximately 1%-2% difference in a conversion rate may make a difference between a connectivity provider routing most of, or almost none of, the traffic for a particular company. One or more embodiments may improve conversion by connecting to a desired destination and not to a voicemail service, and by detecting telecom congestion and retrying a call in a different way.

For example, a two factor authentication service may have a conversion rate of approximately 88% with expected 5% voicemails. The two factor authentication service may have very sensitive traffic because even a small percentage of false positives of voicemail detection significantly lower a conversion rate. One or more embodiments may provide a voicemail detection system that may be reasonably accurate while avoiding false positives. As another example, a number masking service may have an Answer-Seizure Ratio of approximately 70%. At least approximately 5% of lost traffic may be some form of congestion but because there were no error codes, just early media announcements, systems may have difficulty categorizing the lost traffic. One or more embodiments may provide a method to detect in real time call attributes in early media state and retry the call if the call got held up with a congestion announcement.

One or more embodiments may have an overall architecture where all calls, including media, are passed over a Back-to-Back SIP User Agent, or proxy, with a media anchoring component that will, at a proper time in call flow, copy one audio stream and send the audio stream to a media processing component. The media processing component may accumulate incoming audio and perform multi-stage classification. The result of the classification may be returned to a user agent, which may determine a next action (e.g., hang up, retry) to be made for the call. One or more embodiments may include a media processing component. With the arrival of each packet of the audio stream, the media processing component may generate audio segments for recognition. Each segment may be transmitted for analysis. The analysis may include multiple operations as described below.

An initial operation of the audio signal analysis may include performing silence detection. The silence detection may include a signal processing algorithm to remove any audio signal components that do not contain a threshold amount of sound. This algorithm may effectively filter out portions of the audio stream where silence dominates, and focus only on segments that contain relevant sound information. By applying this algorithm, a subsequent analysis may be performed on the audio segments that are more likely to contain meaningful audio data for further processing and recognition purposes.

A subsequent operation of the audio signal analysis may include performing sound classification using machine learning models. For example, the sounds may be classified into three classes: music, ringing, and announcement. Depending on the result of this classification, additional audio analysis may be conducted. If the classification result indicates music or ringing, the process may be concluded, and the corresponding result may be returned. However, if an announcement is detected, the audio signal analysis may proceed with recognition to determine the appropriate label and meaning of the announcement. This may involve further processing of the audio segment to extract relevant information and return the corresponding label and interpretation based on the recognized announcement.

If an announcement is detected, the audio signal analysis may include two operations: (1) creating a fingerprint for that announcement, and (2) searching a fingerprint database. A matching confidence level that is sufficiently high (e.g., above a threshold confidence level) may indicate a matching audio file has been detected. However, if a matching confidence level is not sufficiently high (e.g., below the threshold confidence level) and therefore no matching result is found, the process may wait for a next segment of the announcement. The announcement segments may then be merged, and the process may be repeated.

One or more embodiments may provide a highly efficient process by recognizing audio segments with significantly shorter segments than the original and complete announcements. By utilizing fingerprints and searching a database, the system may quickly identify and associate relevant information with these shorter segments, thus providing effective and efficient recognition of the announcements.

One or more embodiments may include a fingerprint and label database. The database may contain files that will be encountered during the matching process. For fast retrieval of matching files, the number of files in the database may be reduced and labels may be assigned to each file. The fingerprint and label database may be created in several operations. After gathering relevant samples that will constitute the database, an initial operation may be cleaning the dataset, and retaining only files that contain speech. The dataset may contain files that should not be included, such as music or ringing files, and these files may be removed.

One or more embodiments may use a Speech-to-Text service to generate transcriptions for the selected files. The obtained files may include the same messages in multiple languages, or the same message expressed differently (e.g., "user is currently unavailable" or "user is currently not available"). One or more embodiments may create a label for each transcription. The process of creating labels may include a combination of automatic clustering and manual analysis of the dataset. Similar texts may be grouped into clusters, and these clusters may be individually analyzed and assigned labels. A manual analysis may be conducted by considering keyword matching, where specific keywords and phrases are used to identify the nature and content of the texts within each cluster. This process may ensure that the labels accurately represent the characteristics and meaning of the audio segments.

One or more embodiments may remove unnecessary files from the dataset, such as similar files, shorter versions of certain files, and/or nested files, for example. One or more embodiments may remove unnecessary files to maintain a smaller file count within the database. This optimization operation may reduce a size of the database while retaining the essential and distinctive audio segments necessary for accurate recognition and analysis. Such an optimization operation may reduce computational resource use and/or storage use.

One or more embodiments may create a fingerprint for each file in the database. A matching matrix may be constructed by comparing pairs of files, and files with high similarity to other files in the database, yet with shorter durations, may be removed. This operation may retain only the most representative and distinctive files in the database, thus reducing redundancy and optimizing storage space. One or more embodiments may remove files from the database for which no label is recognized. This may be achieved by analyzing the output of the labeling process and identifying files that do not receive any meaningful label or fail to match any predefined criteria. Removing such files may ensure that the database includes reliable and accurately labeled fingerprints of audio segments, which may enhance the overall quality and usability of the system. One or more embodiments may apply these additional cleaning operations, thus refining the database to contain a reduced number of highly relevant and unique files, which may improve the efficiency of the recognition process and maintain the integrity and accuracy of the audio analysis.

One or more embodiments may create a digital fingerprint of every audio file that is available during a training phase. The fingerprint may be a collection of numbers, which may be hashes of some properties of the audio file. One or more embodiments may obtain the properties by finding peaks within the spectrogram of the audio, pairing nearby peaks, and measuring a difference in time between the peaks. One or more embodiments may generate a hash of the triplet of two peaks and their time difference, store the hashes within the fingerprint of the audio. One or more embodiments may use discrete wavelet transformation and locally-sensitive hashing.

One or more embodiments may store the remaining files in the database, which may be ready for use. This final version of the database may contain a curated collection of fingerprints of audio segments, which may be optimized for efficient retrieval and accurate recognition. One or more embodiments may provide a system with a comprehensive and well-organized database that can effectively support various audio processing and analysis tasks. The ready-to-use database may provide a foundation for the successful operation of the system, and enable seamless and reliable recognition of audio segments during real-time applications or any other implementation requiring audio data processing.

One or more embodiments may incorporate new files into the database during a matching process. During the utilization of the system, there may be instances where new files containing announcements emerge that cannot be matched with existing files in the database. In such cases, one or more embodiments may provide a process to seamlessly handle these new files. One or more embodiments may obtain accurate transcriptions of the new files using a speech-to-text conversion technique, to extract meaningful textual representations from the audio content of the new files. Subsequently, fingerprints may be created based on these transcriptions, to capture the unique characteristics and patterns of the audio segments. For example, the transcriptions may define a group of audio files to be used, and the fingerprints may be created from the group of audio files. The fingerprint database may not include potentially private data included in audio content and/or corresponding transcriptions. These fingerprints may facilitate the matching and identification processes. The new fingerprints, may be incorporated into the database. Incorporating the new files may ensure that the system remains adaptable and can effectively handle previously unseen audio segments, thereby maintaining performance and accuracy over time. Accordingly, a fingerprint database may be iteratively updated such that a first instance of the fingerprint database is replaced with a second instance of the fingerprint database. The second instance of the fingerprint database may be an updated version of the first instance of the fingerprint database and may include one or more additional fingerprints based on new files and corresponding transcriptions, as discussed above.

One or more embodiments may analyze whether a file is an early media announcement. If the file is an announcement, one or more embodiments may cache the file. If the file continues to appear above a certain threshold limit, one or more embodiments may add the file to the database.

One or more embodiments may determine whether an unknown file contains any useful information (i.e. not silence or comforting-silence early media) by requiring that the files have an energy above a certain threshold. One or more embodiments may determine whether the file is speech or an announcement by using an audio classifier, such as a machine-learning based algorithm, for example. The machine-learning based algorithm may be a gradient-boosted trees model and a random-forest model, which classify audio into four classes: silence, ringing, music, or speech/announcement. One or more embodiments may proceed with processing if the file is an announcement.

One or more embodiments may determine whether to cache the file, or remove the file from cache and store the file in the database. Caching may refer to saving the file in memory for later referencing. One or more embodiments may cache the file for future reference. When a new file is received, unrecognized, and determined to be an announcement, one or more embodiments may check whether the new file is similar to the cached file. If they are not similar, one or more embodiments may cache the second file. If they are similar, one or more embodiments may store the second occurrence of the first file as a tracked occurrence.

If a file continues to appear above a certain threshold, one or more embodiments may remove the file from the cache and store the file in the database. One or more embodiments may determine a classification or label for the file using labeling/classification approaches discussed herein. For example, one or more embodiments may log all new files which appear, classify the new files on a periodic basis (e.g., daily or weekly basis), and then add the new files to the database. One or more embodiments may use clustering to determine where the file should belong and then assign the file the label of the cluster. One or more embodiments may perform a transcription of the audio and then determine where the file belongs.

FIG. 1 depicts a flowchart of a method of creating a fingerprint database, according to one or more embodiments. As shown in FIG. 1, method 100 may include recording all or a subset of all calls to a dataset (operation 105). One or more embodiments may determine which of the recorded calls were successfully converted (e.g. answered by a human) and, if such information about calls is available by other methods, on an assumption that converted calls will not contain any announcements of interest, remove the converted calls from the dataset (operation 110). Accordingly, as shown in operation 115, only failed calls (e.g. not answered by a human) remain in the dataset. In operation 120, method 100 may include performing a spectral analysis of the recorded calls and generating a fingerprint record for each of the calls in the dataset. Accordingly, as shown in operation 125, the failed calls in the dataset may be associated with a corresponding fingerprint in the dataset. As discussed herein, the dataset may be iteratively updated to include new calls at a subsequent time.

In operation 130, method 100 may include grouping similar records in the dataset based on the fingerprint, and may include removing duplicate records from the dataset. Accordingly, as shown in operation 135, the failed calls in the dataset may be unique, associated with a group, and associated with a corresponding fingerprint in the dataset. In operation 140, method 100 may include performing automatic speech recognition and transcription of each of the calls in the dataset. Accordingly, as shown in operation 145, the failed calls in the dataset may be unique, associated with a group, associated with a corresponding fingerprint in the dataset, and associated with a corresponding transcription in the dataset.

In operation 150, method 100 may include generating a summary of the failed calls in the dataset, such as table 400 as shown in FIG. 4, for example. In operation 155, a human or automated reviewer may review the summary of the failed calls in the dataset, and may change the assigned group. According to an embodiment an automated reviewer may be a machine learning model trained based on historical or simulated calls, historical or simulated summaries, and/or the like. The machine learning model may include neural networks configured to receive, as inputs, the summary of the calls in the dataset and may apply the inputs to one or more machine learning algorithms to output one or more assigned groups. For example, the machine learning model may apply the inputs to one or more layers, weights, biases, synapses, or nodes to output one or more assigned groups. Alternatively, the machine learning model may be a different model other than a neural network and corresponding machine learning algorithms may be applied to output one or more assigned groups. In operation 160, method 100 may include adding a list of categories to the dataset. The list of categories may be output by a categorization machine learning model. The categorization machine learning model may be trained based on historical or simulated datasets. The categorization machine learning model may receive, as an input, a dataset and may apply the input to one or more layers, weights, biases, synapses, or nodes to output one or more categories. In operation 165, method 100 may include sorting the grouped records in the dataset into the defined categories (e.g., as output by the categorization machine learning model).

In operation 170, method 100 may include removing the audio data and text transcriptions from the dataset. In operation 175, method 100 may include generating a fingerprint database with unique and categorized fingerprint records from the dataset, and without the associated audio data or transcript from the dataset.

Method 100 may include recording audio samples of calls to telephone numbers as a dataset, generating corresponding text transcriptions of the recorded audio samples, generating corresponding fingerprints of the recorded audio samples, clustering the recorded audio samples based on the fingerprints and text transcriptions, as groups, assigning a category to each group, and generating a fingerprint database with the groups and the assigned categories. The categories may include an actionable machine response, a non-actionable machine response, or a human response. The actionable machine response may include a Private Branch eXchange announcement requesting extension input.

Method 100 may include classifying the audio sample of the call as music, ringing, or announcement, and removing recorded audio samples from the dataset with a classification of music or ringing. The clustering the recorded audio samples based on the fingerprints and text transcriptions may include grouping recorded audio samples with similar text transcriptions into a single group. Method 100 may include comparing the text transcriptions of the recorded audio samples, and removing redundant recorded audio samples from the dataset where the comparing text transcriptions indicates that a first recorded audio sample is included in a second recorded audio sample, by removing the first recorded audio sample and associated text transcription from the dataset.

Method 100 may include comparing the fingerprints of the recorded audio samples, and removing redundant recorded audio samples from the dataset where the comparing fingerprints indicates that a first recorded audio sample is similar to a second recorded audio sample having a longer duration than the first recorded audio sample, by removing the first recorded audio sample and associated fingerprint from the dataset.

Assigning the category to each group may include removing recorded audio samples with no assigned category from the dataset. Method 100 may include incorporating new audio samples of calls to telephone numbers into the generated fingerprint database.

Figure 2:
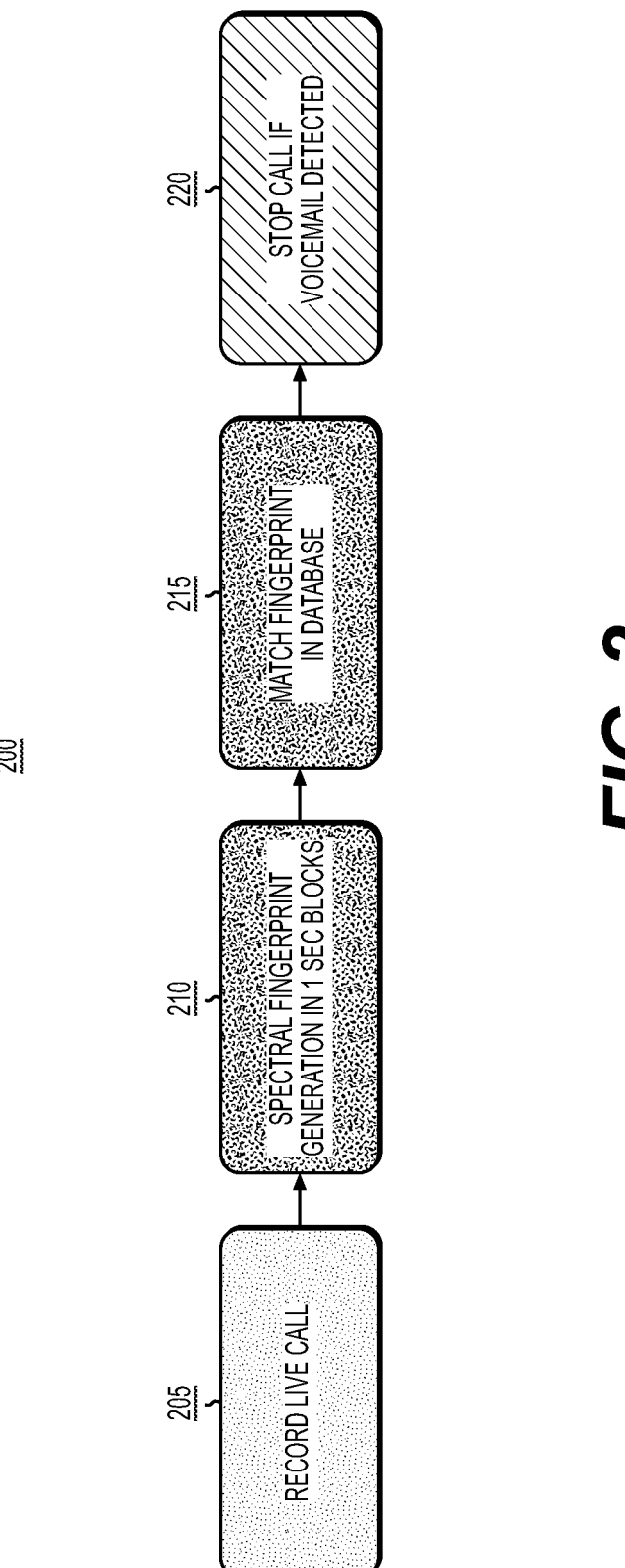
FIG. 2 depicts a flowchart of a method of detecting a call state, according to one or more embodiments.

FIG. 2 depicts a flowchart of a method of detecting a call state, according to one or more embodiments. As shown in FIG. 2, method 200 may include recording a live call (operation 205). In operation 210, method 200 may include generating a spectral fingerprint of an audio sample of the recorded call, such as a one second segment, for example. In operation 215, method 200 may include matching the spectral fingerprint with a fingerprint record in a fingerprint database, such as the fingerprint database generated in FIG. 1, for example. In operation 220, method 200 may include ending a call if the matched fingerprint indicates the recorded call includes a non-actionable machine response, such as a voicemail response, for example.

Method 200 may include initiating a call to a telephone number based on a request from a call originator, generating a fingerprint of an audio sample of the call, matching the fingerprint to a record in a fingerprint database, determining, based on the matched record, whether the recorded call is an actionable machine response, a non-actionable machine response, or a human response, as a detected response, providing the detected response to the call originator, receiving, based on the providing the detected response, an action from the call originator, and performing the action associated with the call.

Generating the fingerprint of the audio sample of the call may include generating a first fingerprint of a first audio sample of the call, and generating a second fingerprint of a second audio sample of the call. An audio sample may be an audio segment, such as one second blocks of an audio recording, for example, or may be an audio file sample, such as a full length recording including multiple audio segments. For example, the second audio sample of the call may include the first audio sample of the call, so that the second audio sample is a longer duration sample than the first audio sample. For example, the first audio sample may be "thank you for call" and the second audio sample may be "thank you for calling ACME. Please choose from the following menu options." Generating the fingerprint of the audio sample of the call may include generating multiple fingerprints in a looping and merging process as needed, such as for approximately 2-3 seconds for fast voicemail detection, or approximately 60 seconds for rolling early media detection. Generating the fingerprint of the audio sample of the call may include detecting silence in the audio sample of the call, determining that the detected silence in the audio sample of the call exceeds a threshold, retrieving a different audio sample of the call, and generating the fingerprint of the different audio sample of the call.

In general, audio may be a very memory intensive type of media. An audio signal may be sampled and quantized before being stored digitally. Commonly, a single audio sample may use two bytes of memory. Sampling rates of audio may differ, but some of the more popular sampling rates are: 8 kHz, 16 kHz, 22.1 kHz, 32 kHz, 44.1 kHz, and 48 kHz. This means that a single second of audio may contain between 8000 to 48000 samples, each sample using two bytes of memory. In terms of storage, this may not be an issue, as storage space is relatively inexpensive and easily available. However, time-sensitive algorithms requiring real-time operation may struggle with full audio samples. Therefore, one or more embodiments may extract useful features from the audio samples prior to matching.

For example, one or more embodiments may use Artificial Intelligence to extract features, such as by training a neural network (or any suitable machine learning algorithm) to recognize useful representations about inputs and to map the representations onto a smaller set of features using an encoder-decoder architecture, for example. One or more embodiments may use Principal Component Analysis as an efficient data reduction technique. One or more embodiments may use spectrogram representation to reduce the audio data dimensionality. A spectrogram of an audio file may be created both in real-time and offline, while remaining unaltered. For example, one or more embodiments may generate a spectrogram directly for an audio file which is one minute long, by applying a Short-time Fourier Transform on the entire audio file. When a similar audio file is streamed in increments of one second, one or more embodiments may generate exactly the same spectrogram, by applying the Fourier transform on every second (or shorter duration, such as approximately 20 ms, for example) of audio and concatenating the results. One or more embodiments may provide the output of one or more of the Principal Component Analysis, spectrogram representation, a transform, and/or the like to a machine learning model trained to output features based at least in part on such inputs.

One or more embodiments may use wavelet representation, similar to a spectrogram representation, to generate a discrete wavelet transformation to obtain a set of features. One or more embodiments may use Constant-Q chromagram, similar to a spectrogram and wavelets, to compute the chromagram. One or more embodiments may use cepstral representations, such as by generating Mel-Frequency Cepstral Coefficients by applying a Mel-filter bank onto the spectrogram, and then performing a Discrete Cosine Transform to further de-correlate the features. The modifications and possibilities are numerous. One or more embodiments may omit the Discrete Cosine Transform and operate on the Mel spectrogram only. Also, one or more embodiments may use the Bark scale or any other suitable frequency scale which describes a human acoustic system. One or more embodiments may provide a system with adjustable parameters, such as changing a type of Discrete Cosine Transform applied, a windowing function, or hyper-parameters.

One or more embodiments may generate features such as a spectral centroid, spectral flatness, spectral roll-off, spectral contrast, or tempogram, or mean, energy, RMS, or other statistical insights of a signal as input features. One or more embodiments may use pre-trained models, such as the Large-Scale Pre-trained Audio Neural Networks for Audio Pattern Recognition (PANNs) family of neural networks to extract useful features of the audio. One or more embodiments may combine any of the above models, such as using wavelets together with features extracted by PANNs, for example.

Generating the fingerprint of the audio sample of the call may include classifying the audio sample of the call into an announcement, among classifications including music, ringing, and announcement, and generating the fingerprint of the audio sample of the call. Classifying the audio sample may include using one or more machine learning models.

Matching the fingerprint to the record in the fingerprint database may include determining that a similarity of the fingerprint to the record exceeds a threshold. Matching the fingerprint to the record in the fingerprint database may include determining that a similarity of the fingerprint, as a first fingerprint, to the record is below a threshold, generating a second fingerprint of an extended audio sample of the call, where the extended audio sample includes the audio sample, as a first audio sample, used for the first fingerprint merged with a second audio sample of the call subsequent to the first audio sample, and determining that a similarity of the second fingerprint to the record is above the threshold.

One or more embodiments may not make a unique distinction between all received early media files, but may obtain useful information about received early media. One or more embodiments may not only recognize identical early media files, but may also identify unknown new media, if the new media is similar enough or shares enough common properties with the known early media files.

One or more embodiments may uniquely identify the audio. One or more embodiments may include a relatively large database of audio files. Machine learning models/algorithms may be trained to uniquely identify such audio files. One or more embodiments may identify similar audio files as the same file. One or more embodiments may classify the audio. One or more embodiments may include a model or algorithm that is trained to assign a label (classification) to an audio file. One or more embodiments may provide the trained model with an obtained file, and receive a label for the file. One or more embodiments may manually receive a label for an audio file.

One or more embodiments may use a clustering technique or algorithm to group audio files based on similarities. One or more embodiments may perform the clustering directly on raw audio. One or more embodiments may perform the clustering on any spectral representation of the audio, or any other features. One or more embodiments may obtain transcriptions of audio files and then cluster the audio files based on the transcriptions. One or more embodiments may obtain a histogram of word occurrences in a transcription, and then cluster the files based on the histogram.

One or more embodiments may use machine learning based approaches, such as Naive Bayes, Decision Trees, Deep Learning, Random Forest algorithms, Gradient Boosted Trees, or neural networks, such as convolutional neural networks, for example. One or more embodiments may train the machine learning model to classify and/or identify early media files. One or more embodiments may use correlational techniques (e.g. matched-filter, cross-correlation) to generate correlational metrics. One or more embodiments may use aggregate the top N % of matches and assign a class to the file based on an algorithm. One or more embodiments may perform correlation on any of the audio features discussed, or on raw audio. For example, one or more embodiments may search for the most correlated spectrogram.

One or more embodiments may use audio, image, or feature retrieval. One or more embodiments may retrieve the most similar audio file from a database based on an input file. In case no perfect match is found, one or more embodiments may return the top N % of matches, return all matches above a certain threshold, or any combination of the two. For example, from a set of all retrieved audio files, one or more embodiments may retain the top 10, and discard files which do not meet a matching threshold. If no files meet the matching threshold, one or more embodiments may classify the audio file as a new, unseen instance.

One or more embodiments may create a digital fingerprint of every audio file that is available during the training phase. The fingerprint may be a collection of numbers, which may be hashes of some properties of the audio file. One or more embodiments may obtain the properties by finding peaks within the spectrogram of the audio, pairing nearby peaks, and measuring a difference in time between the peaks. One or more embodiments may generate a hash of the triplet of two peaks and their time difference, store the hashes within the fingerprint of the audio. One or more embodiments may use discrete wavelet transformation and locally-sensitive hashing.

One or more embodiments may use vector searches to transform audio into a set of features, vectors, or tensors. One or more embodiments may use PANNs to extract useful features from the audio. One or more embodiments may generate a database of the extracted features. One or more embodiments may generate a cepstral representation of audio files and create a database of the cepstral representations. One or more embodiments may generate spectrograms of audio files, hash them, and use locally-sensitive hashing to obtain matches. One or more embodiments may generate a vector database on top of raw audio. One or more embodiments may obtain a 2D representation of audio and use image retrieval techniques.

The providing the detected response to the call originator may include providing the detected response to the call originator as a status code. The performing the action associated with the call may include disconnecting the call, retrying the call on a same channel, or retrying the call on a different channel, route, or gateway.

Figure 3:
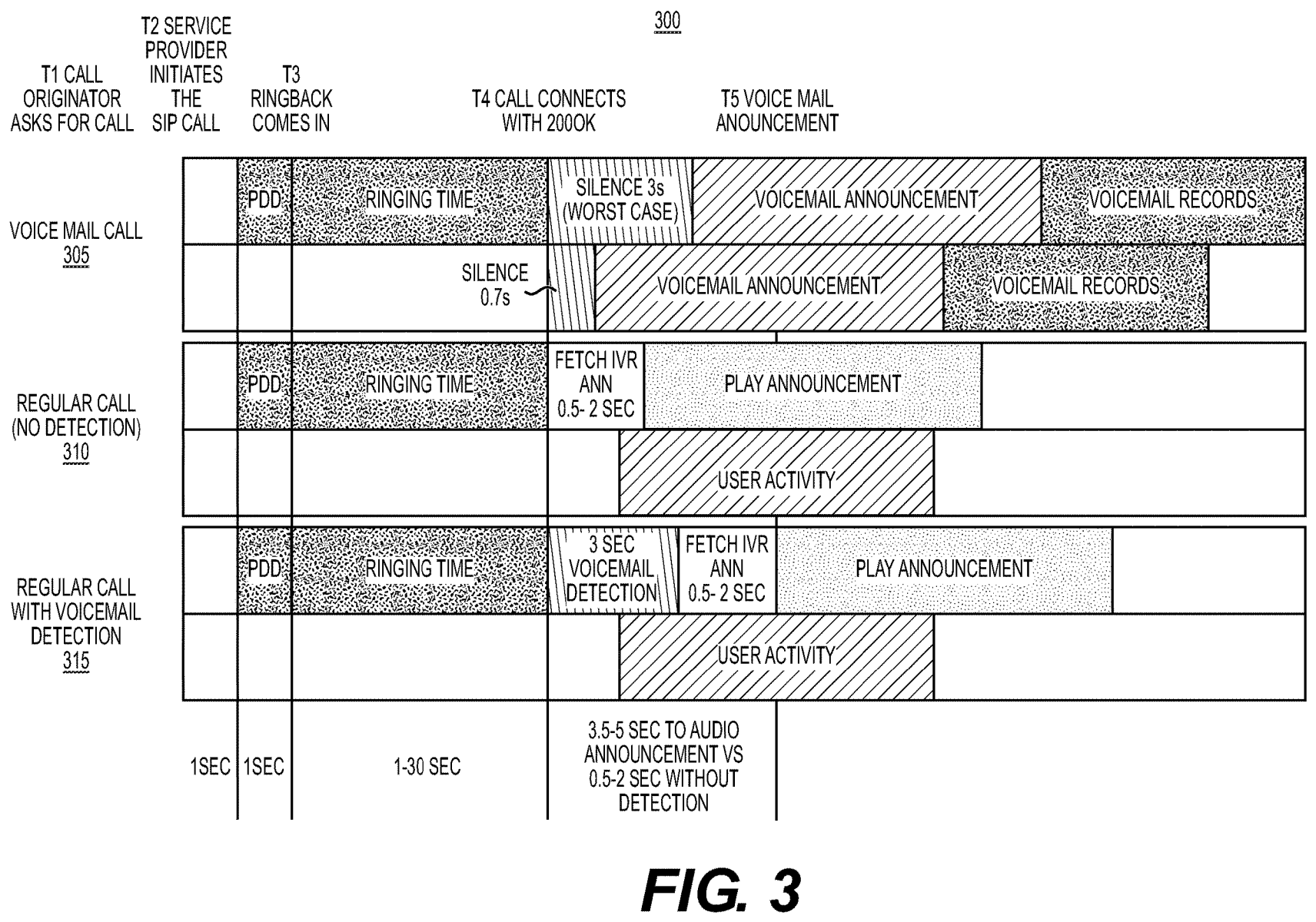

FIG. 3 depicts exemplary timelines for detecting a call state, according to one or more embodiments. Plot 300 depicts voicemail call timeline 305, converted call timeline 310 without voicemail detection, and converted call timeline 315 with voicemail detection. In all three depicted timelines, timestamp 1 (T1) may designate a request from a call originator to connect a call to a telephone number, timestamp 2 (T2) may designate an initiation of the call to the telephone number and a subsequent post-dial delay (PDD), timestamp 3 (T3) may designate a ringing time segment, and timestamp 4 (T4) may designate establishment of the connected call to the telephone number.

In voicemail call timeline 305, subsequent to time T4, the call audio may be silent for approximately 0.7 seconds to approximately 3 seconds, for example. Following the period of silence, the call to the telephone number may return a voicemail announcement followed by a voicemail recording segment.

In converted call timeline 310 without voicemail detection, subsequent to time T4, a service provider may request an Interactive voice response (IVR) from the call originator, which may take from approximately 0.5 seconds to approximately 2 seconds, for example. Upon receipt of the IVR, a service provider may play an announcement to the connected telephone number. As shown in converted call timeline 310, a human may respond to the incoming call with a response such as "Hello?", for example, in parallel with the IVR request and announcement.

In converted call timeline 315 with voicemail detection, subsequent to time T4, a service provider may first detect whether a response from the telephone number is voicemail, which may take approximately 3 seconds, for example. Next, the service provider may request an Interactive voice response (IVR) from the call originator, which may take from approximately 0.5 seconds to approximately 2 seconds, for example. Upon receipt of the IVR, a service provider may play an announcement to the connected telephone number. As shown in converted call timeline 315, a human may respond to the incoming call with a response such as "Hello?", for example, in parallel with the voicemail detection, IVR request, and announcement.

As shown with time T5, although a voicemail detection system may increase a delay time before an announcement is provided to a telephone number, the voicemail detection system may allow a call originator to terminate the call to prevent providing an announcement to a voicemail machine. One or more timestamps disclosed herein may be improved by running the IVR and voicemail detection in parallel.

FIG. 4 depicts exemplary categories for a fingerprint database, according to one or more embodiments. As shown in table 400, text transcriptions of recorded calls in a dataset may be grouped by similarity and assigned categories, using automatic and/or manual operations. For example, transcriptions with slight differences, such as "please leave your message for", "please leave a message for", and "please feel free to leave a message for" may be clustered into a single group (e.g. with a count of 1815 records as shown in table 400), and assigned a category of "voicemail" or "non-actionable machine response", for example. Similarly, responses such as "Thank you for calling" may be grouped and categorized as "PBX announcement", and may be further classified as "voicemail" or as "actionable machine response".

Figure 5:
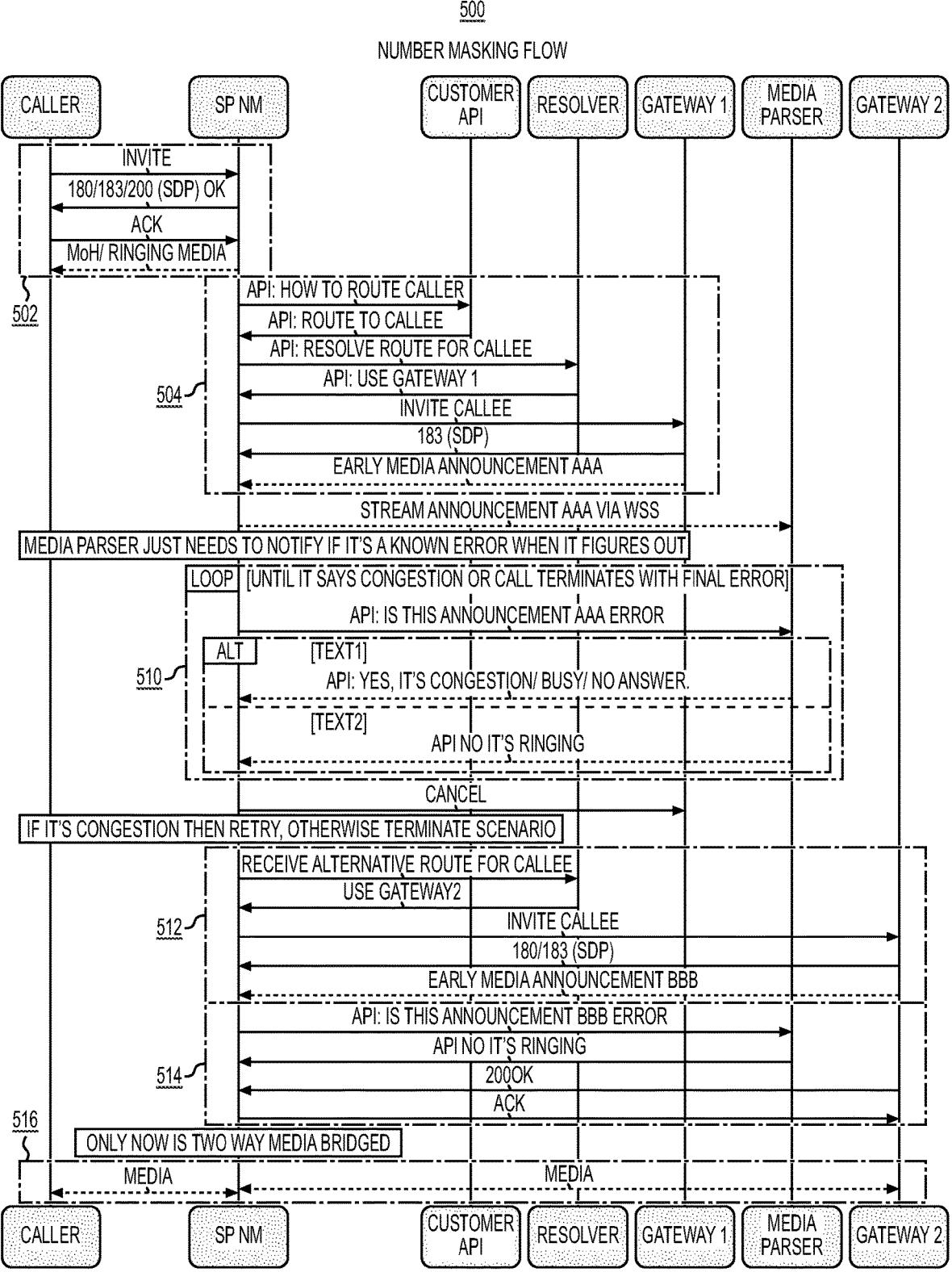
FIG. 5 depicts an exemplary communication diagram, according to one or more embodiments.

FIG. 5 depicts an exemplary communication diagram, according to one or more embodiments. As shown in diagram 500, media detection system 510 may be used in a number masking scenario to determine a type of response from a gateway connection. Number masking for call anonymization may address safety challenges with a ride-share provider. Anonymization may hide passenger and driver numbers, making them more comfortable with voice communication in real-time, instead of having to go through an in-app chat or text messaging system.

For example, as shown in FIG. 5, in operation 502, an origination caller may send a request to a telecommunication service provider to connect with a driver via a ride-share provider. Although a driver and a ride-share provider are provided as examples in FIG. 5, it will be understood that the diagram of FIG. 5 may apply to any applicable origination caller, call recipient, call requester, entity, organization, and/or the like. The service provider may acknowledge the request, and provide an on-hold or ringing response to the origination caller. In operation 504, the service provider may then communicate with the ride-share provider, determine a destination telephone number via a first gateway, initiate a connection to the destination telephone number, and receive a first response from the destination telephone number.

The telecommunication service provider may use media detection system 510 to determine a type of response from the destination telephone number via the first gateway connection, as discussed above. For example, media detection system 510 may use a fingerprint database to determine whether the first response is one or more of an error, congestion, busy, no answer, or ringing. In operation 512, if the media detection system 510 determines the connection to destination telephone number is congested via the first gateway, the service provider may then determine the destination telephone number via a second gateway, initiate a connection to the destination telephone number, and receive a second response from the destination telephone number.

In operation 514, the telecommunication service provider may use media detection system 510 to determine a type of response from the destination telephone number via the second gateway connection, as discussed above. For example, media detection system 510 may use a fingerprint database to determine whether the second response is one or more of an error, congestion, busy, no answer, or ringing. If the media detection system 510 determines the connection to destination telephone number is ringing, in operation 516, the service provider may then bridge the connection between the origination caller and the destination telephone number.

In general, any process or operation discussed in this disclosure may be computer-implementable, such as the processes illustrated in FIG. 1, FIG. 2, or FIG. 5, and may be performed by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices. One or more processors of a computer system may be included in a single computing device or distributed among a plurality of computing devices. A memory of the computer system may include the respective memory of each computing device of the plurality of computing devices.

Figure 6:
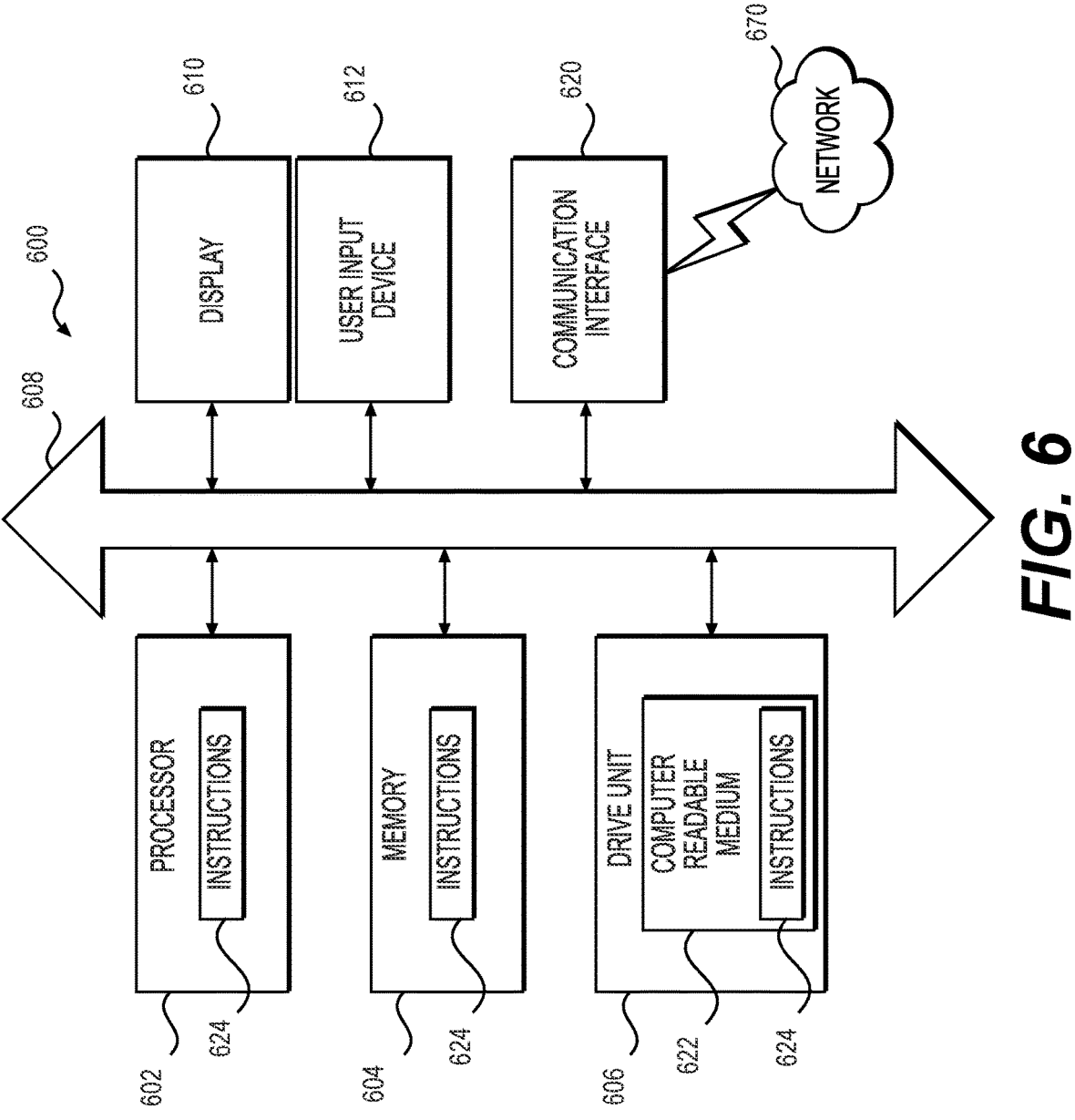
FIG. 6 is a simplified functional block diagram of a computer system that may be configured as a device for executing the techniques disclosed herein, according to one or more embodiments.

FIG. 6 is a simplified functional block diagram of a computer system 600 that may be configured as a device for executing the techniques disclosed herein, according to exemplary embodiments of the present disclosure. Computer system 600 may generate features, statistics, analysis, and/or another system according to exemplary embodiments of the present disclosure. In various embodiments, any of the systems (e.g., computer system 600) disclosed herein may be an assembly of hardware including, for example, a data communication interface 620 for packet data communication. The computer system 600 also may include a central processing unit ("CPU") 602, in the form of one or more processors, for executing program instructions 624. The computer system 600 may include an internal communication bus 608, and a storage unit 606 (such as ROM, HDD, SDD, etc.) that may store data on a computer readable medium 622, although the computer system 600 may receive programming and data via network communications (e.g., over a network 670). The computer system 600 may also have a memory 604 (such as RAM) storing instructions 624 for executing techniques presented herein, although the instructions 624 may be stored temporarily or permanently within other modules of computer system 600 (e.g., processor 602 and/or computer readable medium 622). The computer system 600 also may include input and output ports 612 and/or a display 610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Figure 7:
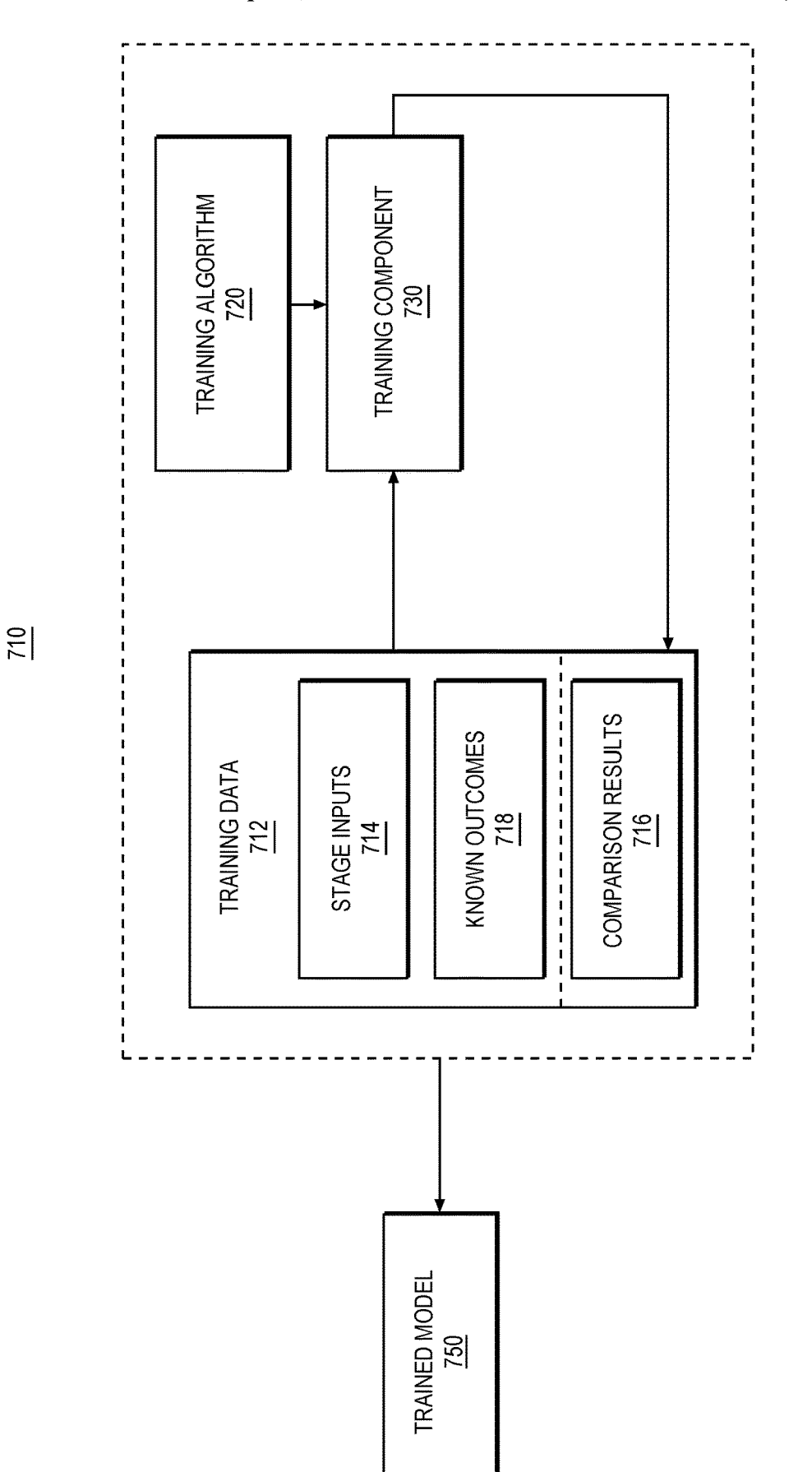
FIG. 7 depicts a flow diagram for training a machine learning model, according to one or more embodiments.

As disclosed herein, one or more implementations disclosed herein may be applied by using a machine learning model. A machine learning model as disclosed herein may be trained using one or more components or operations of FIGS. 1-6. As shown in flow diagram 710 of FIG. 7, training data 712 may include one or more of stage inputs 714 and known outcomes 718 related to a machine learning model to be trained. The stage inputs 714 may be from any applicable source including a component or set shown in the figures provided herein. The known outcomes 718 may be included for machine learning models generated based on supervised or semi-supervised training. An unsupervised machine learning model might not be trained using known outcomes 718. Known outcomes 718 may include known or desired outputs for future inputs similar to or in the same category as stage inputs 714 that do not have corresponding known outputs.

The training data 712 and a training algorithm 720 may be provided to a training component 730 that may apply the training data 712 to the training algorithm 720 to generate a trained machine learning model 750. According to an implementation, the training component 730 may be provided comparison results 716 that compare a previous output of the corresponding machine learning model to apply the previous result to re-train the machine learning model. The comparison results 716 may be used by the training component 730 to update the corresponding machine learning model. The training algorithm 720 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

A machine learning model disclosed herein may be trained by adjusting one or more weights, layers, and/or biases during a training phase. During the training phase, historical or simulated data may be provided as inputs to the model. The model may adjust one or more of its weights, layers, and/or biases based on such historical or simulated information. The adjusted weights, layers, and/or biases may be configured in a production version of the machine learning model (e.g., a trained model) based on the training. Once trained, the machine learning model may output machine learning model outputs in accordance with the subject matter disclosed herein. According to an implementation, one or more machine learning models disclosed herein may continuously update based on feedback associated with use or implementation of the machine learning model outputs.

While the presently disclosed methods, devices, and systems are described with exemplary reference to transmitting data, it should be appreciated that the presently disclosed embodiments may be applicable to any environment, such as a desktop or laptop computer, a mobile device, a wearable device, an application, or the like. In addition, the presently disclosed embodiments may be applicable to any type of Internet protocol.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
initiating a call to a telephone number based on a request from a call originator;
generating a fingerprint of an audio sample of the call based on determining whether the audio sample includes silence that exceeds a threshold;
matching the fingerprint to a record in a fingerprint database, the fingerprint database including records of non-actionable machine responses representing voicemails;
determining, based on the matched record, whether the call includes an actionable machine response, a non-actionable machine response, or a human response, as a detected response;
providing the detected response to the call originator;
receiving, based on the providing the detected response, an action from the call originator; and
performing the action associated with the call.

2. The method of claim 1, wherein the generating the fingerprint of the audio sample of the call includes:
generating a first fingerprint of a first audio sample of the call, and
generating a second fingerprint of a second audio sample of the call.

3. The method of claim 2, wherein the second audio sample of the call includes the first audio sample of the call, such that the second audio sample is a longer duration sample than the first audio sample.

4. The method of claim 1, wherein the generating the fingerprint of the audio sample of the call includes:
detecting the silence in the audio sample of the call;
determining that the detected silence in the audio sample of the call exceeds the threshold;
retrieving a different audio sample of the call; and
generating the fingerprint of the different audio sample of the call.

5. The method of claim 1, wherein the generating the fingerprint of the audio sample of the call includes:
classifying the audio sample of the call as an announcement, among classifications including music, ringing, and announcement; and
generating the fingerprint of the audio sample of the call based on classifying the audio sample.

6. The method of claim 5, wherein the classifying the audio sample includes using one or more machine learning models.

7. The method of claim 1, wherein the matching the fingerprint to the record in the fingerprint database includes:
determining that a similarity of the fingerprint to the record exceeds a threshold.

8. The method of claim 1, wherein the matching the fingerprint to the record in the fingerprint database includes:
determining that a similarity of the fingerprint, as a first fingerprint, to the record is below a threshold;
generating a second fingerprint of an extended audio sample of the call, wherein the extended audio sample includes the audio sample, as a first audio sample, used for the first fingerprint merged with a second audio sample of the call subsequent to the first audio sample; and
determining that a similarity of the second fingerprint to the record is above the threshold.

9. The method of claim 1, wherein the providing the detected response to the call originator includes:
providing the detected response to the call originator as a status code.

10. The method of claim 1, wherein the performing the action associated with the call includes:
disconnecting the call, retrying the call on one of a same channel, route, or gateway, or retrying the call on a different channel, route, or gateway.

11. A method comprising:
recording audio samples of calls to telephone numbers as a dataset;
generating corresponding text transcriptions of the recorded audio samples;
generating corresponding fingerprints of the recorded audio samples;
clustering the recorded audio samples based on the fingerprints and text transcriptions, as groups;
assigning a category to each group;
generating a fingerprint database with the groups and the assigned categories, wherein the assigned categories include a non-actionable machine response representing voicemail; and
incorporating fingerprints of new audio samples of calls to telephone numbers into the generated fingerprint database based on determining whether at least one of the new audio samples includes silence that exceeds a threshold.

12. The method of claim 11, further comprising:
classifying the audio samples of the calls as music, ringing, or announcement; and
removing recorded audio samples from the dataset with a classification of music or ringing.

13. The method of claim 11, wherein the clustering the recorded audio samples based on the fingerprints and text transcriptions includes:
grouping recorded audio samples with similar text transcriptions into a single group.

14. The method of claim 11, further comprising:
comparing the text transcriptions of the recorded audio samples; and removing redundant recorded audio samples from the dataset where the comparing text transcriptions indicates that a first recorded audio sample is included in a second recorded audio sample, by removing the first recorded audio sample and associated text transcription from the dataset.

15. The method of claim 11, further comprising:
comparing the fingerprints of the recorded audio samples; and
removing redundant recorded audio samples from the dataset where the comparing fingerprints indicates that a first recorded audio sample is similar to a second recorded audio sample having a longer duration than the first recorded audio sample, by removing the first recorded audio sample and associated fingerprint from the dataset.

16. The method of claim 11, wherein:
the categories further include an actionable machine response or a human response, and
the actionable machine response includes a Private Branch exchange announcement requesting extension input.

17. A system comprising one or more processors configured to execute a method including:
initiating a call to a telephone number based on a request from a call originator;
generating a fingerprint of an audio sample of the call based on determining whether the audio sample includes silence that exceeds a threshold;
matching the fingerprint to a record in a fingerprint database, the fingerprint database including records of non-actionable machine responses representing voicemails;
determining, based on the matched record, whether the call includes an actionable machine response, a non-actionable machine response, or a human response, as a detected response;
providing the detected response to the call originator;
receiving, based on the providing the detected response, an action from the call originator; and
performing the action associated with the call.

18. The system of claim 17, wherein the generating the fingerprint of the audio sample of the call includes:
classifying the audio sample of the call as an announcement, among classifications including music, ringing, and announcement; and
generating the fingerprint of the audio sample of the call based on classifying the audio sample.

19. The system of claim 17, wherein the performing the action associated with the call includes:
disconnecting the call, retrying the call on one of a same channel, route, or gateway, or retrying the call on a different channel, route, or gateway.

20. The system of claim 17, wherein generating the fingerprint of the audio sample of the call includes:
generating a first fingerprint of a first audio sample of the call; and
generating a second fingerprint of a second audio sample of the call.

* * * * *